April 8, 1941.  H. E. TAUTZ  2,237,511
VARIABLE SPEED TRANSMISSION
Filed Dec. 2, 1937  2 Sheets-Sheet 1
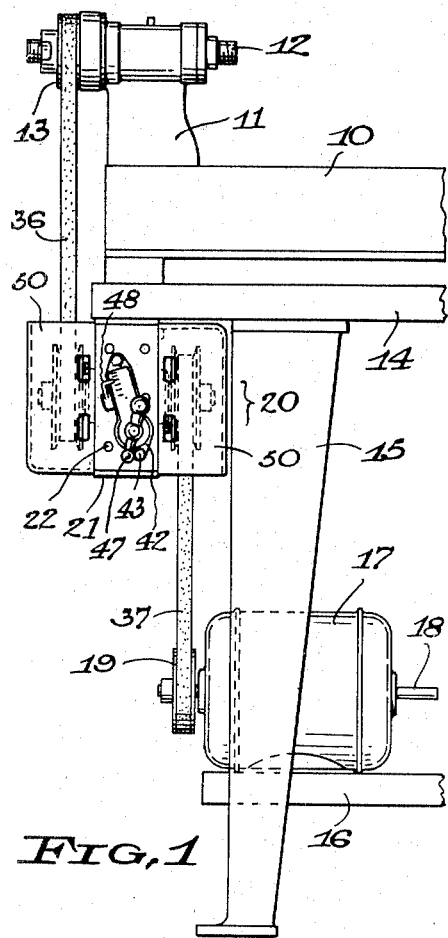
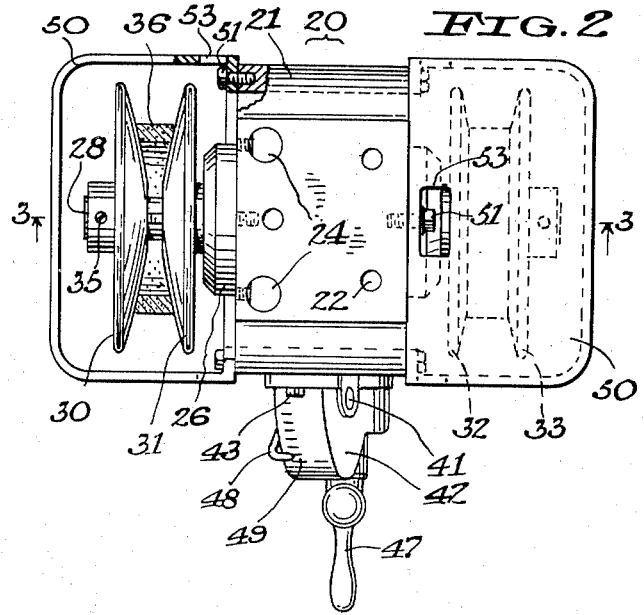
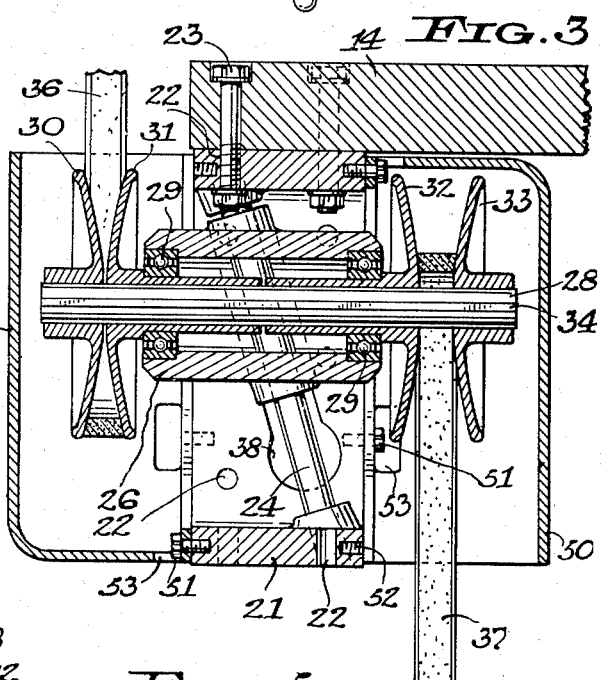
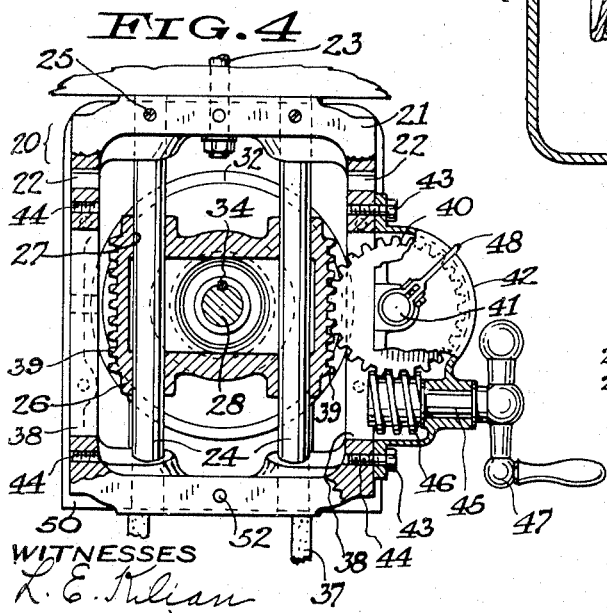
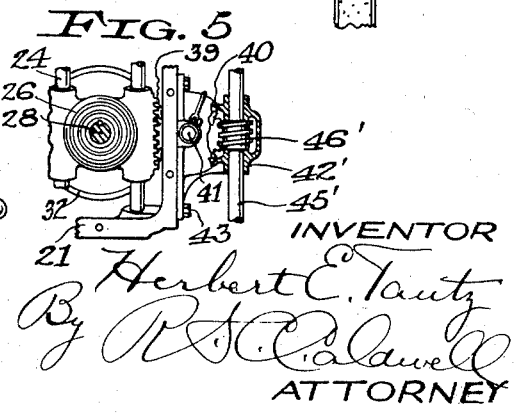
INVENTOR
Herbert E. Tautz
By R. S. Caldwell
ATTORNEY
WITNESSES
L. E. Kilian
C. L. Naal April 8, 1941.　　　　　H. E. TAUTZ　　　　　2,237,511
VARIABLE SPEED TRANSMISSION
Filed Dec. 2, 1937　　　2 Sheets-Sheet 2

WITNESSES
L. E. Kilian
C. L. Waal

INVENTOR
Herbert E. Tautz
By R. S. Caldwell
ATTORNEY

Patented Apr. 8, 1941

2,237,511

UNITED STATES PATENT OFFICE 2,237,511

VARIABLE SPEED TRANSMISSION

Herbert E. Tautz, Milwaukee, Wis., assignor to The Delta Manufacturing Company, Milwaukee, Wis., a corporation of Wisconsin Application December 2, 1937, Serial No. 177,667

1 Claim. (Cl. 74—230.17)

The invention relates to variable speed power transmissions, and more particularly to belt transmissions of the type embodying expansible pulleys or sheaves.

An object of the invention is to provide an improved variable speed belt transmission of simple, durable, and compact character and of relatively inexpensive construction, capable of ready adjustment for varying the speed ratio, and of such construction as to facilitate mounting and control when used with different types of machines.

Another object of the invention is to provide a variable speed belt transmission which has simple but effective means for accurately guiding the working parts and for maintaining belt alignment at different speed ratios.

A further object is to provide a variable speed belt transmission which will permit easy application and replacement of belts.

The invention further consists in the several features hereinafter described and claimed.

In the accompanying drawings, illustrating certain embodiments of the invention:

Fig. 1 is a front elevation of a variable speed transmission of the invention as applied to a lathe;

Fig. 2 is a top plan view of a transmission device or unit, parts being broken away and parts being shown in section;

Fig. 3 is a sectional view taken on the line 3—3 of Fig. 2, but showing the device adjusted for high-speed operation;

Fig. 4 is an end view of the transmission device, parts being removed and broken away and parts being shown in section, the device being adjusted for an intermediate speed;

Fig. 5 is a fragmentary view generally similar to Fig. 4 but showing a modified form of transmission control;

Figure 6:
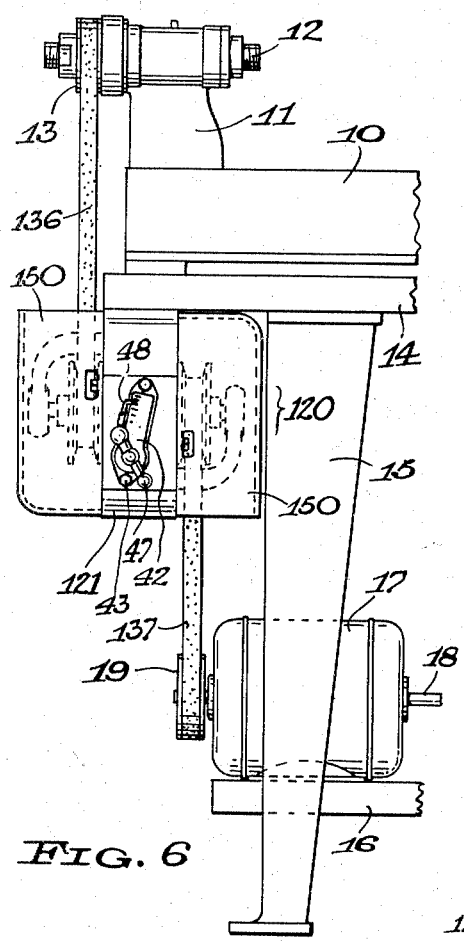
Fig. 6 is a view similar to Fig. 1 but showing a modified form of transmission.

In the drawings, the invention is illustrated by way of example in connection with a lathe, although the invention is capable of general use. The lathe comprises a bed 10 having a head stock 11 mounted thereon, the head stock including the usual spindle 12 provided with a pulley 13, here indicated to be of the V-type. The lathe bed 10 is secured on a bench 14 provided with supporting legs 15, one being shown. At their lower portions, the legs carry a shelf 16 on which is mounted an electric motor 17 or other power device having its shaft 18 parallel to the lathe spindle and provided with a pulley 19, here shown to be of the V-type. The motor shaft and lathe spindle are drivingly connected by a transmission of the invention.

In that form of the invention shown in Figs. 1 to 4, the transmission embodies a transmission device or unit designated generally by 20. A rigid frame 21 in the form of a closed rectangular loop with opposite parallel open sides is provided with bolt openings 22 in all four walls to permit the frame to be readily fastened in various positions and to various supports. In the present instance, the frame is placed below the end portion of the bench top, the top wall of the frame being secured to the bottom face of the bench by bolts 23.

The frame carries therein a pair of spaced parallel guide rods 24 which extend at a suitable angle, as hereinafter described, to the open sides of the frame. The top and bottom walls of the frame are embossed and bored to receive the opposite ends of the rods, and the rods are secured in place as by means of set screws 25 engaging flatted end portions of the rods.

Slidably mounted on the guide rods 24 is a tubular shaft carrier or housing 26 having parallel guide bores 27 in opposite side extensions to receive the rods therethrough. A shaft 28 extends through the carrier between the guide rods and in parallel relation to the lathe spindle, and is indirectly journalled, as hereinafter described, in ball bearings 29 mounted in the counterbored opposite ends of the carrier. The shaft 28 lies between the lathe spindle and the motor shaft, although not necessarily in a common plane therewith, a considerable amount of offset being permissible and sometimes desirable.

Hubbed, cone-faced disks or pulley sections 30, 31, 32 and 33 are carried on the shaft 28 and are prevented from relative rotation by a long key 34 on the shaft. The outermost pulley sections, 30 and 33, are adjustably fixed on the opposite ends of the shaft, as by set-screws 35, while the intermediate pulley sections, 31 and 32, are splined on the shaft by the key and have elongated, shouldered, sleeve-like hubs which are carried by the inner races of the ball bearings 29. The inner ends of the said inner hubs are here shown spaced apart but it is possible to have these ends in engagement, or to fixedly connect the hubs to each other, since they turn in unison with one another. Each pulley section has a conically formed belt-engaging face, preferably slightly convexly curved or crowned. The two pairs of pulley sections, 30, 31, and 32, 33, form a pair of V-pulleys to be engaged by V-belts 36 and 37, respectively, the V-belt 36 passing over the spindle pulley 13, and the V-belt 37 passing over the motor pulley 19.

The carrier or housing 26 is slidable on the guide rods 24 to change the effective pulley radii and thereby the speed ratio, as hereinafter more fully described. The upper ends of the guide rods 24 are closer to the plane of the belt 36 than the lower ends, so as to cause the intermediate pulley sections to shift axially as the carrier is moved up or down on the rods, and in a proper direction to maintain the alignment of the belts, as hereinafter described. The angle of the guide rods is here indicated to substantially correspond with the angle of the conical faces of the pulley sections, but this is not critical.

The frame 21 is provided with slot-like openings 38 in its opposite side walls, and the carrier 26 is provided on its side extensions with toothed racks 39 in register with the openings and parallel to the guide rods 24. Either one of the racks may mesh with a gear 40 projecting through the adjacent frame opening 38 and fast on a shaft 41 which is journalled in a casing 42, the casing being rigidly secured to the outer face of the frame side wall by screws 43 engaging tapped openings 44 in the frame. A shaft 45 is journalled in the casing and carries a worm 46 meshing with the gear 40, and forming therewith an irreversible drive. A crank-handle 47 is secured to the outer end of the shaft 45. A pointer 48 is carried on a projecting end of the shaft 41 and has a bent outer end movable over a scale 49 on an arcuate outer portion of the casing. The casing 42, with the gearing carried thereby, may be secured to either side wall of the frame, so as to meet different mounting conditions, and to place the control in the best operating position.

A pair of marginally flanged guards 50 are secured to the opposite open faces of the frame 21 by means of screws 51 which selectively enter tapped openings 52 formed in the frame, the guards having lateral openings 53 for access to the screws. One side of each guard is open to admit the corresponding belt. The guards are interchangeable and may be mounted in reversed position to accommodate different installations, wherein the belts approach the expansible pulleys from directions opposite to those shown in the drawings. Either of the expansible pulleys may be used as the power-receiving pulley.

Where a different type of speed control is desired or required, it is necessary only to substitute a different type of gear casing with different gearing or linkage, no other changes being requisite. One modified form of speed control is shown in Fig. 5, wherein a substitute gear housing 42' is secured to the transmission frame 21 and a worm 46' is carried on a vertical shaft 45' journalled in the casing. The construction is otherwise the same as that of Fig. 4.

In the operation of the transmission of Figs. 1 to 4, power is transmitted from the motor through the V-belt 37 to the pulley sections 32 and 33 with which the belt has a side-driving relation, thus driving the shaft 28, which forms a countershaft or jack-shaft. Power is transmitted from the shaft 28 to the V-belt 36 which has a side-driving relation with the pulley sections 30 and 31 on the shaft, thereby rotating the lathe spindle 12.

In order to vary the spindle speed, the shaft carrier 26 is moved up or down on the guide rods 24 by rotating the crank-handle 47, the motion being transmitted through the worm 46, the gear 40, and the rack 39 on the carrier. When the carrier is moved up, the belt 37 is forced to engage at a smaller radius on the pulley 32, 33, while belt 36 engages at a larger radius on the pulley 30, 31, thus causing the lathe spindle to run at a higher speed. Simultaneously the shaft carrier 26 with fixed pulley sections 31, 32 is moved to the left as viewed in Fig. 3, while shaft 28 with floating pulley sections 30, 33 is moved to the right, thereby maintaining the alignment of the belts. The shaft 28 is free to move or float axially within the pulley sections 31 and 32 to a position determined by the belts. In a similar manner, the lathe spindle speed is reduced when the shaft carrier 26 is moved down on the guide rods 24. The carrier has an extended, long-wearing and closely fitting bearing, in slidable engagement with the guide rods, so that the shaft 28 remains parallel to the motor shaft and lathe spindle in all adjusted positions.

Figure 7:
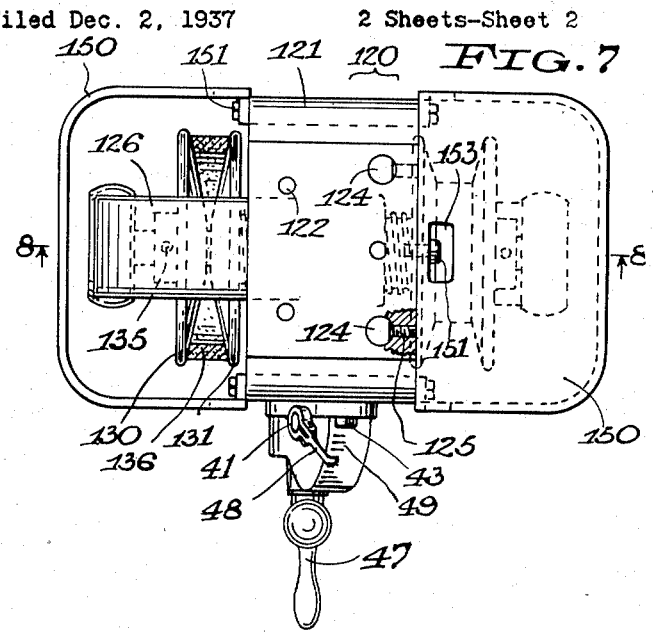
Fig. 7 is a top plan view of the transmission device of Fig. 6.
Figure 8:
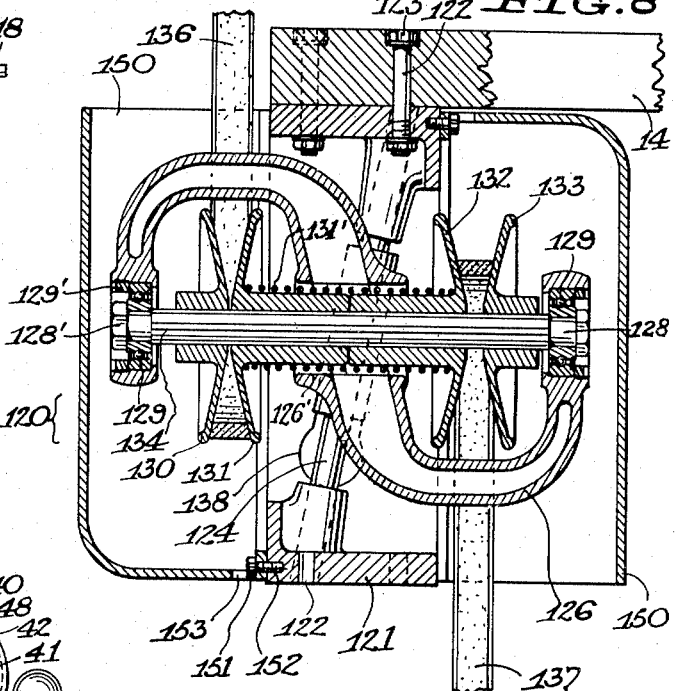
Fig. 8 is a sectional view taken on the line 8—8 of Fig. 7, but showing the device adjusted for high-speed operation.
Figure 9:
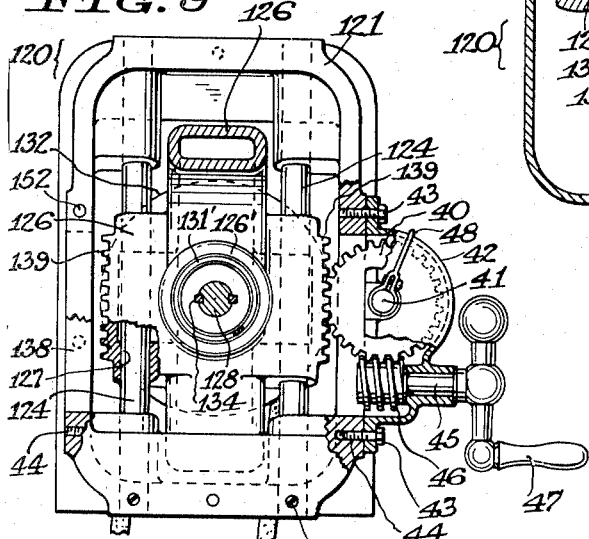
Fig. 9 is an end view of the transmission device of Fig. 6, parts being removed and broken away and parts being shown in section.

Figs. 6 to 9 show a modified form of transmission which is generally similar to that above described. In this transmission, the transmission device or unit is designated generally by 120. A rigid frame 121 in the form of a closed rectangular loop with opposite parallel open sides is provided with bolt openings 122 in its top and bottom walls to permit the frame to be fastened in various positions and to various supports. The frame is here shown to be fastened below the bench top by bolts 123.

The frame carries therein a pair of spaced parallel guide rods 124 which extend at a suitable angle, as hereinafter described, to the open sides of the frame. The top and bottom walls of the frame are provided with lugs or bosses bored to receive the opposite ends of the rods, and the rods are secured in place as by means of set-screws 125 engaging flatted end portions of the rods.

Slidably mounted on the guide rods 124 is a hollow or tubular S-shaped shaft carrier or housing 126 having parallel guide bores 127 at opposite sides to receive the rods therethrough, the bores extending through side extensions on an intermediate portion of the carrier. A shaft 128 extends through an aperture 126' in an intermediate part of the carrier in parallel relation to the lathe spindle, and is journalled at its reduced ends in ball bearings 129 mounted in the end portions of the S-shaped carrier, the inner races of the bearings being secured to the shaft by nuts 128' and the outer races being secured in the carrier ends by screw-threaded rings 129'. The shaft 128 lies between the lathe spindle and motor shaft although not necessarily in a common plane therewith, a considerable amount of offset being permissible and sometimes desirable.

Hubbed, cone-faced disks or pulley sections 130, 131, 132 and 133 are carried on the shaft 128 and are prevented from relative rotation by long, diametrically opposite keys 134 on the shaft. The outermost pulley sections, 130 and 133, are adjustably fixed on the shaft, as by set-screws 135, while the intermediate pulley sections, 131 and 132, are splined on the shaft by the keys 134 and have sleeve-like hubs adapted to abut against each other. In some instances, the pulley sections 131 and 132 may be urged apart by a surrounding coiled spring 131' to take up belt slack. This spring, however, can generally be omitted. Each pulley section has a conically formed belt-engaging face, preferably slightly curved or crowned. The two pairs of pulley sections, 130, 131, and 132, 133, form a pair of pulleys to be engaged by V-belts 136 and 137, respectively, the belt 136 passing over the spindle pulley 13 and the belt 137 passing over the motor pulley 19. One part of the S-shaped carrier or housing arches over the pulley sections 130 and 131 and extends between the runs of the belt 136 while another part passes under the pulley sections 132 and 133 and extends between the runs of the belt 137, so as not to interfere with belt-changing.

The carrier or housing 126 is slidable on the guide rods 124 to change the effective pulley radii and thereby the speed ratio, as hereinafter more fully described. The upper ends of the guide rods 124 are closer to the plane of the belt 137 than the lower ends, so as to cause the outermost pulley sections to shift laterally as the carrier is moved up or down on the rods, and in a proper direction to maintain the alignment of the belts, as hereinafter described. The angle of the guide rods is here indicated to substantially correspond with the angle of the conical faces of the pulley sections, but this is not critical.

The frame 121 is provided with slot-like openings 138 in its opposite side walls, and the carrier 126 is provided on its side extensions with toothed racks 139 along opposite sides in register with the openings and parallel to the guide rods. Either one of the racks may mesh with a gear 40 which is mounted and controlled as in the device of Figs. 1 to 4. Other forms of controls may readily be substituted, such as that shown in Fig. 5.

A pair of marginally flanged, interchangeable guards 150 are secured to the opposite open sides of the frame 121 by means of screws 151 which enter tapped openings 152 in the frame, the guards having lateral openings 153 for access to the screws. One side of each guard is open to admit the corresponding belt.

The operation of the transmission of Figs. 6 to 9 is substantially the same as that of the one shown in Figs. 1 to 4, the carrier being moved up to increase the lathe spindle speed and down to reduce the speed thereof. The outermost pulley sections, 130 and 133, have a positive axial movement to maintain belt alignment, while the intermediate pulley sections, 131 and 132, are free to axially shift or float; whereas, in the transmission of Figs. 1 to 4, the intermediate pulley sections, 31 and 32, have a positive axial movement, while the outermost pulley sections, 30 and 33, are free to axially shift or float. Upon its upward movement, the shaft carrier 126 with fixed pulley sections 130, 133 is moved to the right as viewed in Fig. 8, and the floating pulley sections 131 and 132 are moved to the left, thereby maintaining the alignment of the belts.

In each form of the invention the shiftable mounting of the counter-shaft is of such character as to minimize play, to insure accuracy and long life, and to simplify control. A wide variety of controlling devices can readily be employed. The transmission device or unit is of compact construction, requiring but little space for installation, and the frame can readily be mounted in any one of various selected positions, so as to facilitate the use of the transmission with different types of machines. The belts can readily be applied and replaced without requiring dismantling of the transmission, and, if desired, without removing the guards, although the guards can easily be detached and replaced.

What I claim as new and desire to secure by Letters Patent is:

A variable speed transmission device comprising a carrier, a bearing carried thereby, a shaft mounted in said bearing, said carrier having lugs thereon, on opposite sides with respect to the shaft, said lugs having parallel guideways therein, the guideways being inclined at an acute angle to the axis of the said shaft, parallel guide rods received in said guideways, relatively stationary means secured to said rods at their ends to maintain them in proper position, a pair of expansible pulleys carried by said shaft and mechanically interconnected to cause one to expand when the other contracts, and self-locking adjusting means for shifting the said carrier along the rods, said adjusting means including a set of gear teeth on one side of the carrier, a gear in mesh with the same, a duplicate set of gear teeth on the opposite side of the carrier, and a worm engaging the said gear, said duplicate set of gear teeth making it possible to mount the gear and worm on either side of the carrier.

HERBERT E. TAUTZ.